United States Patent [19]

Segl, Jr.

[11] 4,138,453

[45] Feb. 6, 1979

[54] PROCESS FOR MANUFACTURING BLOWN FILM SHEETING

[75] Inventor: Walter E. Segl, Jr., Orwigsburg, Pa.

[73] Assignee: Exxon Research & Engineering Co., Florham Park, N.J.

[21] Appl. No.: 797,783

[22] Filed: May 17, 1977

[51] Int. Cl.$^2$ .............................................. B29F 3/08

[52] U.S. Cl. ................................... 264/22; 264/40.1; 264/40.3; 264/572; 264/540; 264/146; 425/72 R; 425/326.1

[58] Field of Search ............ 264/95, 210 R, 145–146, 264/90, 22, 89, 40.1, 40.3; 425/326.1, 72, 144

[56] References Cited

U.S. PATENT DOCUMENTS

| | | | |
|---|---|---|---|
| 3,088,167 | 5/1963 | Corbett | 425/326.1 |
| 3,170,011 | 2/1965 | Cheney et al. | 264/95 |
| 3,291,876 | 12/1966 | Justus | 264/210 R |
| 3,355,531 | 11/1967 | Barnhart et al. | 264/95 |
| 3,491,009 | 1/1970 | Ramaika | 264/22 |
| 3,762,853 | 10/1973 | Upmeier | 425/326.1 |
| 3,775,035 | 11/1973 | Scotto et al. | 425/144 |
| 3,976,733 | 8/1976 | Havens | 264/146 |
| 4,003,973 | 1/1977 | Kurokawa et al. | 264/146 |

*Primary Examiner*—Jeffery R. Thurlow
*Attorney, Agent, or Firm*—John J. Mahon

[57] ABSTRACT

Blown film sheeting is manufactured using a tubular film blowhead fitted with internal and external air cooling devices, a collapsible frame for flattening the tubular film and a slitting device positioned above the frame for producing the film in sheet form just prior to removal of the film on dual takeoff rolls. The invention is particularly adaptable for thermoplastic polyethylene film.

4 Claims, 2 Drawing Figures and is particularly suitable for use in connection with polyethylene film.

The invention is specifically illustrated with reference to the accompanying drawings and the following description thereof.

Figure 1:
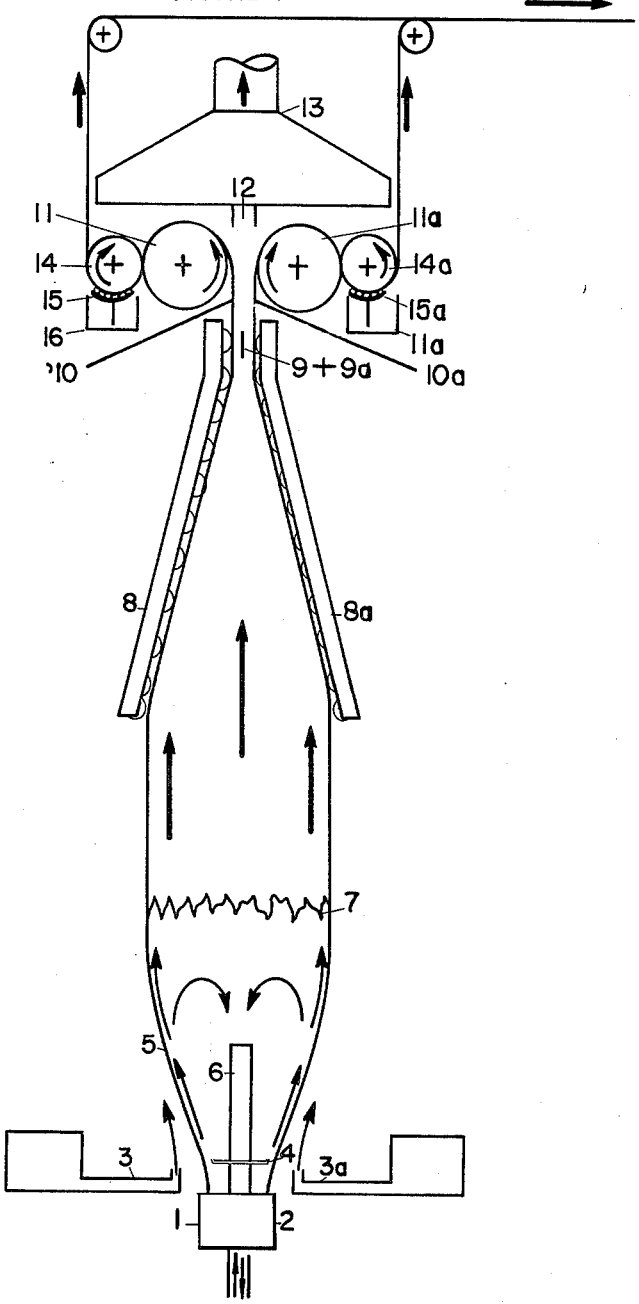

FIG. 1 represents the apparatus used in practicing the invention. Molten plastic, such as polyethylene, is conveyed from an extruder (not shown) through a die 2 which is part of a blowhead housing 1. The blowhead is fitted with both external 3 and 3a and internal 4, air cooling rings which have annular discharge passages for directing a circumferential air stream upon the molten film tubular bubble 5 as it leaves the extrusion die. Internal cooling air may be introduced and removed through the exhaust stack 6 filled into the blowhead. Above the freeze line 7 of the tubular film is positioned a collapsing frame 8 and 8a for flattening the tubular film and at the upper terminal portion of the frame are positioned knife edges 9 and 9a for slitting the tubular film along its edge to produce two film sheets 10 and 10a which are taken off by the double set of horizontally adjustable takeoff rolls 11 and 11a which are movable to control the size of the aperture 12 formed as a result of slitting the tubular film. Internal air is removed through exhaust hood 13 positioned above the controlled aperture 12. A dielectric roll and nip is indicated at 14 and 14a, a corona treatment bar adjacent thereto at 15 and 15a with ozone exhaust hoods at 16 and 16a.

Figure 2:
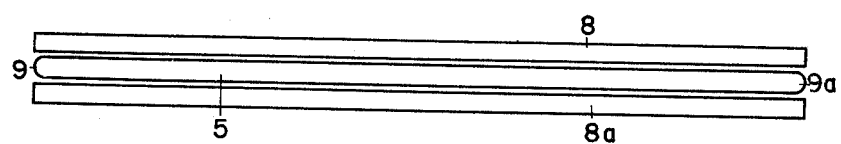

FIG. 2 is a top view of the flattened tubular film 5, the knife edges 9 and 9a and the collapsing frame 8 and 8a.

What is claimed is:

1. A process for manufacturing thermoplastic film in sheet form utilizing a tubular blowhead apparatus which comprises producing a blow tubular film bubble by extruding said film through an extrusion die, blowing said film with the blowhead positioned adjacent to said extrusion die, the blowhead having internal and external air cooling means below the freeze line of the film, cooling said film bubble with said internal and external air cooling means, conveying the tubular bubble upwardly and collapsing it to a relatively flat cross-sectional tube and, immediately prior to the takeoff mechanism, slitting the opposed edges of the collapsed film with a cutting device to form two sheets of film from the tubing and an aperture between said sheets, the takeoff mechanism comprising a double set of horizontally adjustable takeoff rolls for hauling off the film sheets and controlling the size of the aperture between the film sheets and conveying the internal cooling air out of the tubular bubble through the aperture using air exhaust means positioned above the takeoff rolls.

2. The process of claim 1 wherein the film is thermoplastic polyethylene.

3. The process of claim 1 wherein all of the internal cooling air admitted through the blowhead is withdrawn only through the air exhaust means positioned above the takeoff rolls.

4. The process of claim 1 wherein the one or both takeoff rolls comprise dielectric rolls used in corona treatment of the film, a treater bar being positioned adjacent to the dielectric roll.

* * * * *

PROCESS FOR MANUFACTURING BLOWN FILM SHEETING

This invention relates to blown plastic film in sheet form and an improved device for producing same. More particularly, the invention relates to films, made from polyethylene or other thermoplastic resins, prepared in tubular form from a blowhead, but converted to sheet form as part of the manufactured process prior to winding the film for shipment or storage. The invention further relates to improved equipment for manufacturing sheet film from tubular blown film, characterized by a slitting device, dual takeoff rolls, and improved cooling means as part of the manufacturing equipment. The invention further relates to improved methods for cooling extruded blown tubular plastics film exiting from a conventional blowhead.

In general, manufacture of tubular thermoplastic films, such as low or high density polyethylene, polyvinyl chloride, or nylon films, or mixtures thereof prepared by coextrusion utilizing a blowhead adjacent to an extrusion die, is well known in the art. Utilization of internal and external air cooling devices, such as cooling rings, to cool the molten film, together with takeoff rolls which form a vertically supported tubular bubble, is also generally known. Representative disclosures are found in U.S. Pat. No. 3,088,167 issued May 7, 1963 to Corbett; U.S. Pat. No. 3,170,011 issued Feb. 16, 1965 to Cheney et al; and U.S. Pat. No. 3,709,290 issued Jan. 9, 1973 to Upmeier.

In conventional processing using a blowhead, the film is prepared in tubular form, flattened, and taken off onto winding rolls. The present invention relates only to the more efficient manufacture of blown film sheeting.

The use of slitting means in other types of film extrusion and tubular blowing devices is disclosed in U.S. Pat. No. 3,291,876 issued Dec. 13, 1966 to Justus, British Pat. No. 1,429,064 (1966), British Pat. No. 1,188,817 (1970) and U.S. Pat. No. 4,003,973 issued Jan. 18, 1977 to Kurokawa et al. These disclosures deal with different methods of film manufacture. In the Justus patent, the tubing is extruded downwardly, the bubble being formed between the die and the takeoff rolls; an air nozzle projects into the tube, and, at the end of this nozzle are a pair of cutting blades which continuously slit the tube. In British Pat. No. 1,429,064 heat softening tubular plastic is extruded over a gas bearing and contacted with a mandrel whose temperature is maintained below the softening temperature of the tube; a slitting means is provided in conjunction with this device above a tube collapsing means. British Pat. No. 1,188,817 employs a trapped bubble process for the production of thermoplastic polymeric film wherein a coolant is circulated through a liquid-gas heat exchanger which is located in the interior of the bubble to effect cooling of the interior gas. This reference discloses slitting devices adjacent the nip rolls for providing the film in sheet form. U.S. Pat. No. 4,003,973 discloses the production of polypropylene film by extruding resin downwardly from an annular die in contact with cooling liquids on the outside and inside of the film, with the side ends of the film being cut lengthwise before the film is withdrawn by the nip rolls and the cooling liquid being withdrawn through the slit in the film. None of these references disclose the particular method of the present invention, whereby the slitting operation is used to facilitate internal air cooling and exchange.

In accordance with the present invention, there is provided a process for manufacturing thermoplastic blown film sheeting utilizing a tubular film blowhead apparatus which comprises forming a blown tubular film bubble from an extrusion blowhead, the blowhead having internal and external air cooling means, conveying the tubular film upwardly within a collapsing frame positioned above the freeze line of the film, collapsing the film to a relatively flat cross-sectional tubular form, and immediately prior to the takeoff rolls, slitting the edges of the tubular film with suitable cutting devices, such as knives, the cutting devices being positioned adjacent to the edges of the film and opposite the top of the collapsing frame whereby separate sheets of film are formed, when withdrawing the sheets utilizing a double set of takeoff rolls. The internal cooling air present is conveyed upwardly and out of the interior of the slit tubular film bubble through the aperture between the takeoff rolls; the rolls are provided with means to adjust the size of the aperture by separating the takeoff roll axes.

Internal cooling air in the present invention can be withdrawn either through a central stack as well as upwardly through the gap created when the sheets are formed. Alternatively, the exhaust stack in the blowhead can be closed or replaced with air inlet supply conduits so that the air flow through the blowhead is inward only, thereby further increasing the cooling potential and overall process rate.

The process and apparatus of the present invention offer a number of advantages, mainly a substantial rate improvement in the manufacture of film sheeting. Moreover, conventional internal air exchange designs tend to concentrate the high temperature air in the upper portion of the tubular bubble above the reach of the customary central exhaust stack. In the present invention, the dual takeoff rolls and slitting of the tubular film prior to the takeoff rolls creates an aperture permitting the natural convective flow to assist discharge of hot air, and in most cases, eliminates the need for the customary central exhaust stack. As noted previously, additional cooling air can be introduced by replacing the exhaust stack with air inlet means, thus increasing the cooling efficiency and throughput potential of the overall system. An air exhaust hood is positioned above the aperture in the tube to remove internal cooling air. The aperture is controllable to provide for further regulation of air flow by adjusting the relative positioning of the takeoff roll axes which can move in a horizontal plane.

It is well known that corona treatment of film is facilitated with warm film; a further advantage of this invention is that it enables this treatment step to be carried out more efficiently by covering each takeoff roll with a dielectric material suitable for corona discharge. The energy requirements of the process are reduced, since the film is still warm when the corona treatment is carried out. The ozone generated may be removed using a common fume hood. Further advantages involve improvements in sheet film quality in that the blocking tendency, that is, the tendency of film layers to adhere together when removed in tubular form, is effectively eliminated.

The process and apparatus of the present invention are generally applicable to all types of plastic film sheeting capable of being manufactured with a blowhead,